US012133035B2

(12) United States Patent
Yazawa et al.

(10) Patent No.: US 12,133,035 B2
(45) Date of Patent: Oct. 29, 2024

(54) MICROPHONE ARRAY

(71) Applicant: NIPPON TELEGRAPH AND TELEPHONE CORPORATION, Tokyo (JP)

(72) Inventors: Sakurako Yazawa, Tokyo (JP); Kazunori Kobayashi, Tokyo (JP); Kenichi Noguchi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 309 days.

(21) Appl. No.: 17/638,811

(22) PCT Filed: Sep. 2, 2019

(86) PCT No.: PCT/JP2019/034324
§ 371 (c)(1),
(2) Date: Feb. 26, 2022

(87) PCT Pub. No.: WO2021/044453
PCT Pub. Date: Mar. 11, 2021

(65) Prior Publication Data
US 2022/0312095 A1 Sep. 29, 2022

(51) Int. Cl.
*H04R 1/08* (2006.01)
*H04R 1/40* (2006.01)

(52) U.S. Cl.
CPC ............ *H04R 1/083* (2013.01); *H04R 1/406* (2013.01)

(58) Field of Classification Search
CPC .. H04R 3/005; H04R 1/406; H04R 2201/401; H04R 2430/20; H04R 5/027; H04R 2201/403; H04R 29/005
See application file for complete search history.

(56) References Cited

U.S. PATENT DOCUMENTS

2013/0101141 A1* 4/2013 McElveen ............... H04S 3/002 381/123

FOREIGN PATENT DOCUMENTS

| | | | |
|---|---|---|---|
| JP | 2010-028162 | A | 2/2010 |
| JP | 2010074452 | A | 4/2010 |
| JP | 2015-198412 | A | 11/2015 |

* cited by examiner

*Primary Examiner* — Kile O Blair

(57) ABSTRACT

A microphone array is a microphone array including two or more microphone holders 1. The two or more microphone holders 1 each hold one microphone. The two or more microphone holders 1 are separatable from each other. The two or more microphone holders 1 are combinable in two or more combination manners different from each other such that the two or more microphone holders 1 are each in contact with any one of the other microphone holders 1 and a distance between the two respective microphones held by two of the microphone holders 1 that are in contact with each other is a predetermined distance.

7 Claims, 9 Drawing Sheets

MICROPHONE ARRAY

CROSS-REFERENCE TO RELATED APPLICATIONS

This application is a U.S. National Stage Application filed under 35 U.S.C. § 371 claiming priority to International Patent Application No. PCT/JP2019/034324, filed on 2 Sep. 2019, the disclosure of which is hereby incorporated herein by reference in its entirety.

TECHNICAL FIELD

The present invention relates to a sound pickup technology.

BACKGROUND ART

A microphone array described in Patent Literature 1 is known as a conventional microphone array (see, for example, Patent Literature 1).

CITATION LIST

Patent Literature

Patent Literature 1: Japanese Patent Laid-Open No. 2015-198412

SUMMARY OF THE INVENTION

Technical Problem

However, once a conventional microphone array is arranged, it is difficult to change the arrangement to pick up sound in another environment.

An object of the present invention is to provide a microphone array that is easier to change in arrangement than ever.

Means for Solving the Problem

A microphone array according to an aspect of the invention includes two or more microphone holders. The two or more microphone holders each hold one microphone, the two or more microphone holders are separatable from each other, the two or more microphone holders are combinable in two or more combination manners different from each other such that the two or more microphone holders are each in contact with any one of the other microphone holders and a distance between the two respective microphones held by two of the microphone holders that are in contact with each other is a predetermined distance, and a distance between the two respective microphones held by the two of the microphone holders that are in contact with each other in a case where the two or more microphone holders are combined in a first combination manner of the two or more combination manners different from each other may be different from a distance between the two respective microphones held by the two of the microphone holders that are in contact with each other in a case where the two or more microphone holders are combined in a second combination manner other than the first combination manner of the two or more combination manners different from each other.

Effects of the Invention

It is possible to more easily change arrangement of a microphone array than ever.

BRIEF DESCRIPTION OF DRAWINGS

FIG. 10 is a right-side view of the microphone holder.

DESCRIPTION OF EMBODIMENTS

Figure 1C:
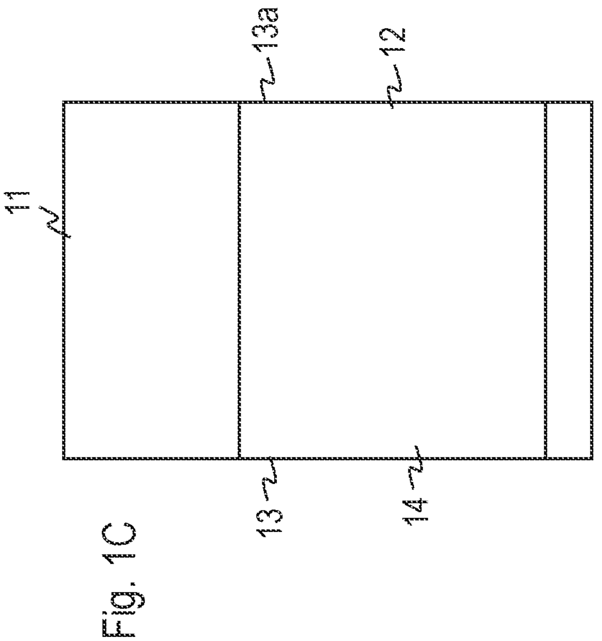
FIG. 1A is a plan view of a microphone holder.
FIG. 1B is a back view of the microphone holder.

A detailed description will be made below on an embodiment of the present invention with reference to the drawings. It should be noted that the same numeral is used to refer to components with the same function in the drawings and a redundant description will be omitted.

First, a point of the invention will be described. As mentioned above, a typical microphone array is configured such that a plurality of microphones are fixed to a microphone unit. However, a resolution required of a microphone array sometimes varies with intended used. For example, in a case where it is desired to collect sound in full 360 degrees by placing the microphone array on the desk, enhancement of azimuth-by-azimuth resolution is required. In contrast, in a case where it is desired to collect a sound signal generated from a living space by placing the microphone array on a shelf in the living room, enhancement of azimuth-by-azimuth resolution within 180 degrees in a front direction is required, for example. In the latter case with use of the microphone array for collecting sound in full 360 degrees, if a positional relationship between the microphones is fixed, resolution for 180 degrees in a rear direction is not necessary but the microphones and an operation amount are consumed. Accordingly, for the purpose of enhancing a resolution for a desired direction, a microphone array capable of changing positions of microphones to allow for maximum use of resources such as the microphones and an operation amount is proposed. In addition, for the purpose of reducing an operation amount related to subsequent signal processing, the design may be made such that a microphone-to-microphone distance still satisfies predetermined conditions irrespective of a change of the positions of the microphones.

Figure 3:
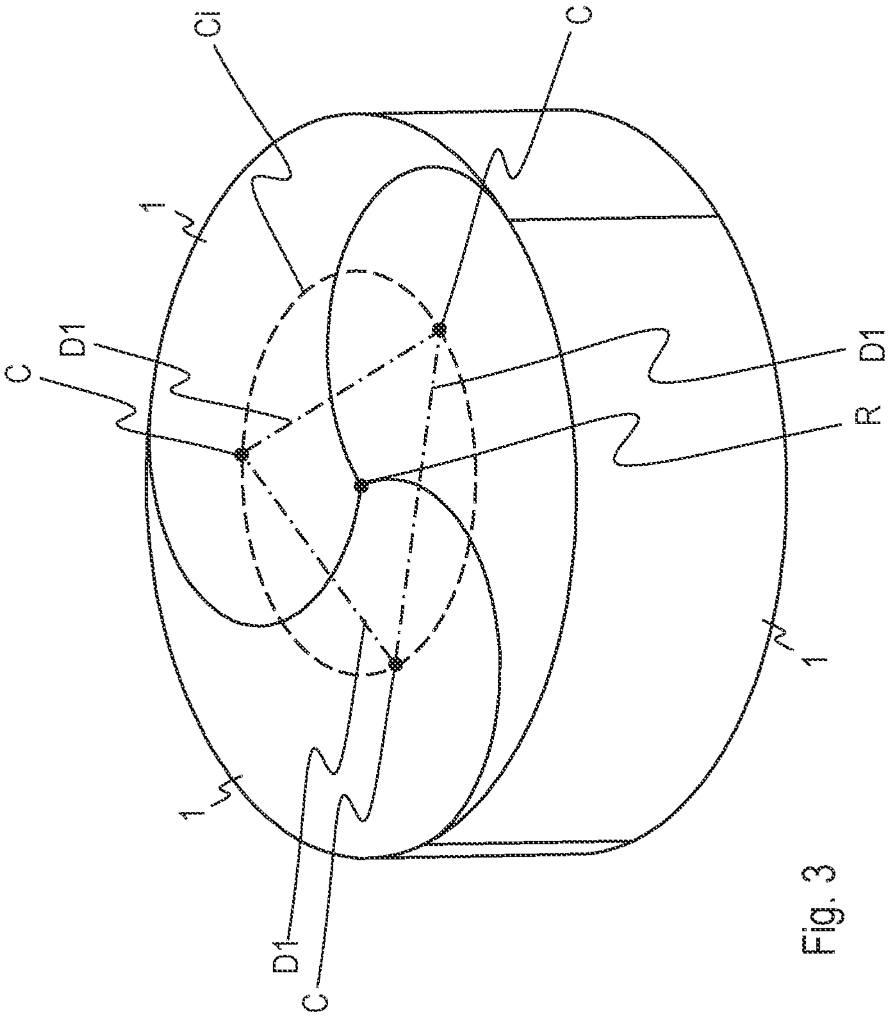
FIG. 3 shows an example of a first combination manner of the microphone holder in FIG. 1.

Description will be made on a form for the above-described 360-degree sound collection by taking a case of three microphones as an example. As shown by way of example in FIG. 3, the design is made such that microphone holders 1 can be combined with the three microphones placed on an outer periphery of a circle Ci having a predetermined radius around a reference point R. In FIG. 3, the reference point R is a center around which the three microphone holders 1 are combined. This is one of conditions for the 360-degree sound collection. In addition, the microphone holders 1 may be placed such that lengths D1 of lines connecting adjacent ones of the microphones to each other become equal. This is also to standardize direction-by-direction resolution and reduce an operation amount. Further, the microphone holders 1 are formed to enable minimum fixation by themselves with a change in a form of the microphone array prevented; however, a connector, which is not shown, may be used for fixation. This is a first array form.

Figure 4:
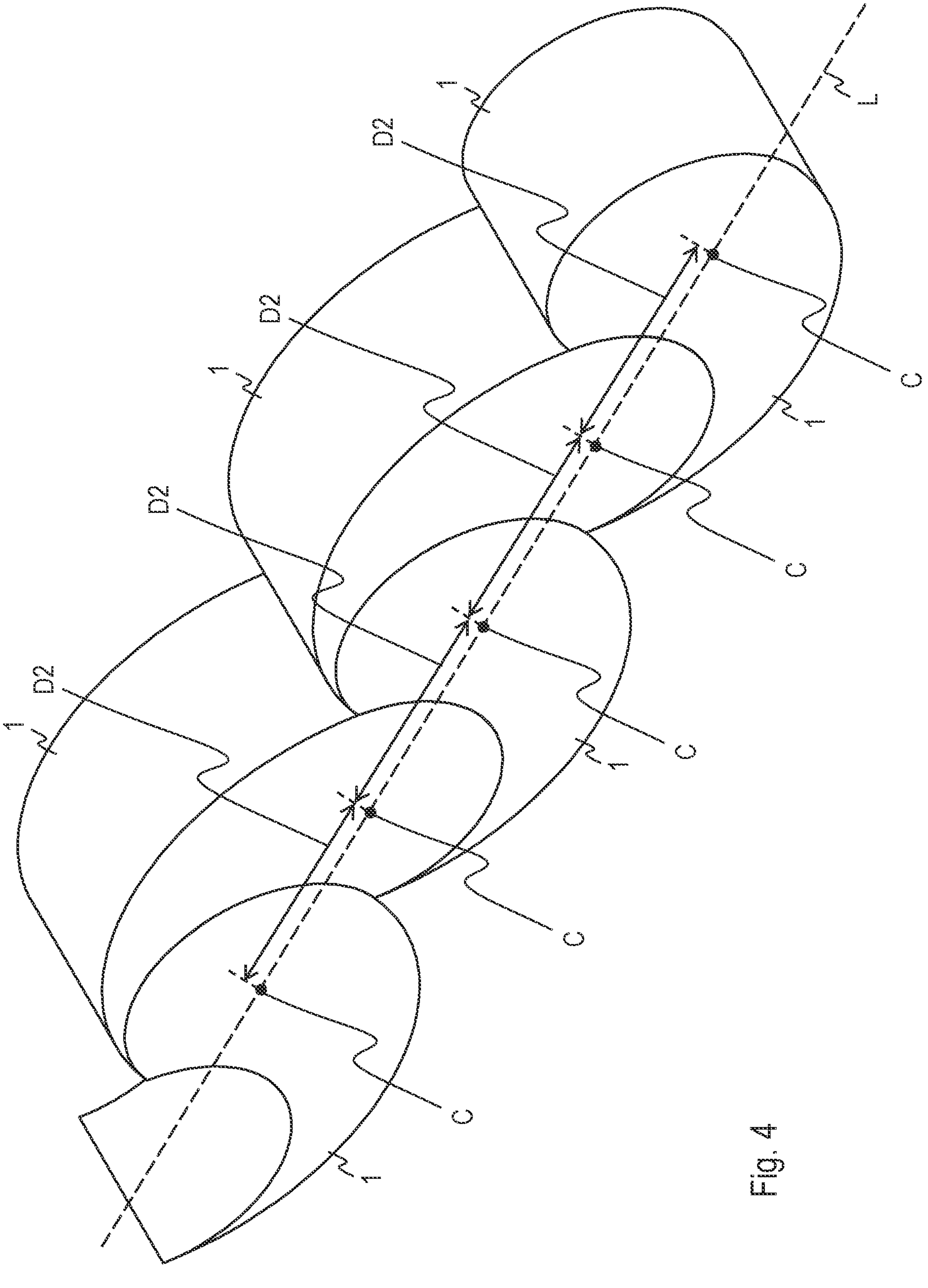
FIG. 4 shows an example of a second combination manner of the microphone holder in FIG. 1.
Figure 5C:
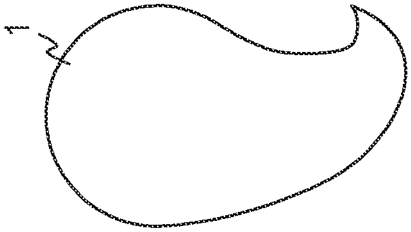
FIG. 5C is a right-side view of the microphone holder.
Figure 5B:
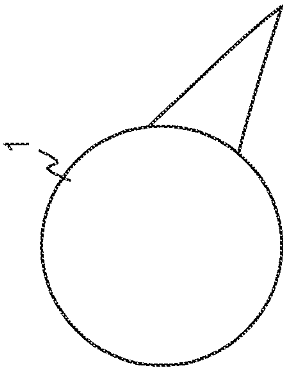
FIG. 5B is a back view of the microphone holder.
Figure 5A:
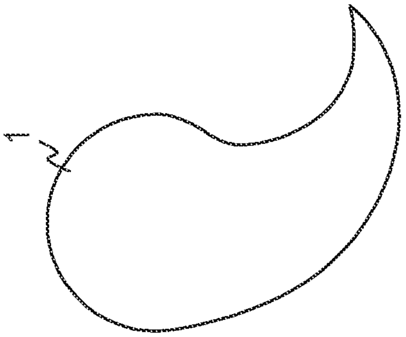
FIG. 5A is a plan view of a microphone holder.
Figure 5E:
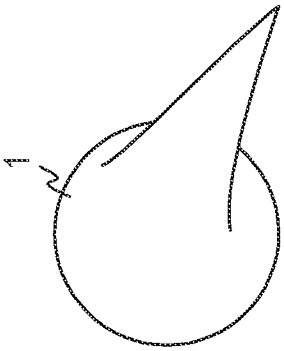
FIG. 5E is a front view of the microphone holder.
Figure 5D:
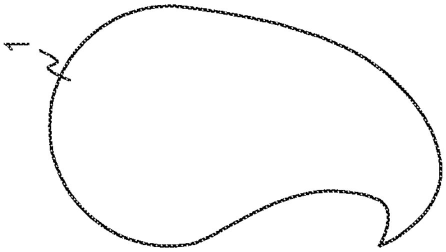
FIG. 5D is a left-side view of the microphone holder.

Next, description will be made on a form for the 180-degree sound collection. As shown in FIG. 4, the microphone holders 1 and microphones are the same as those in the above-described form for the 360-degree sound collection and the microphone holders 1 are rearranged such that the microphones are at positions as in a so-called line array. In this case, the microphone holders 1 are arranged such that a straight line L connecting the microphones to each other is on the same plane and the microphones are to collect sound from 180 degrees in the front direction or the rear direction. For the purpose of reducing an operation amount, the microphone holders 1 may be placed such that lengths D2 of lines connecting adjacent ones of the microphones become equal. In a later-described example, the design is made such that all the microphones are arranged on a single straight line; however, it is not essential. This is a second array form.

Description will be made below on a microphone array capable of alternate rearrangement at least between the first array form and the second array form.

The microphone array includes two or more of the microphone holders 1.

Figure 1B:
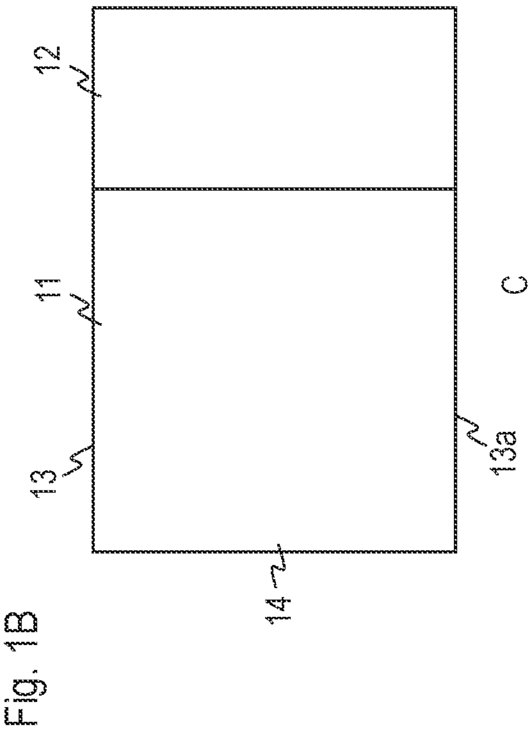
Figure 1A:
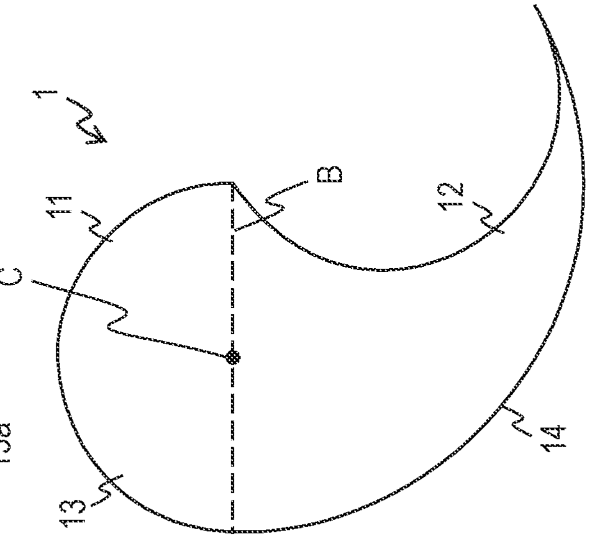
Figure 2:
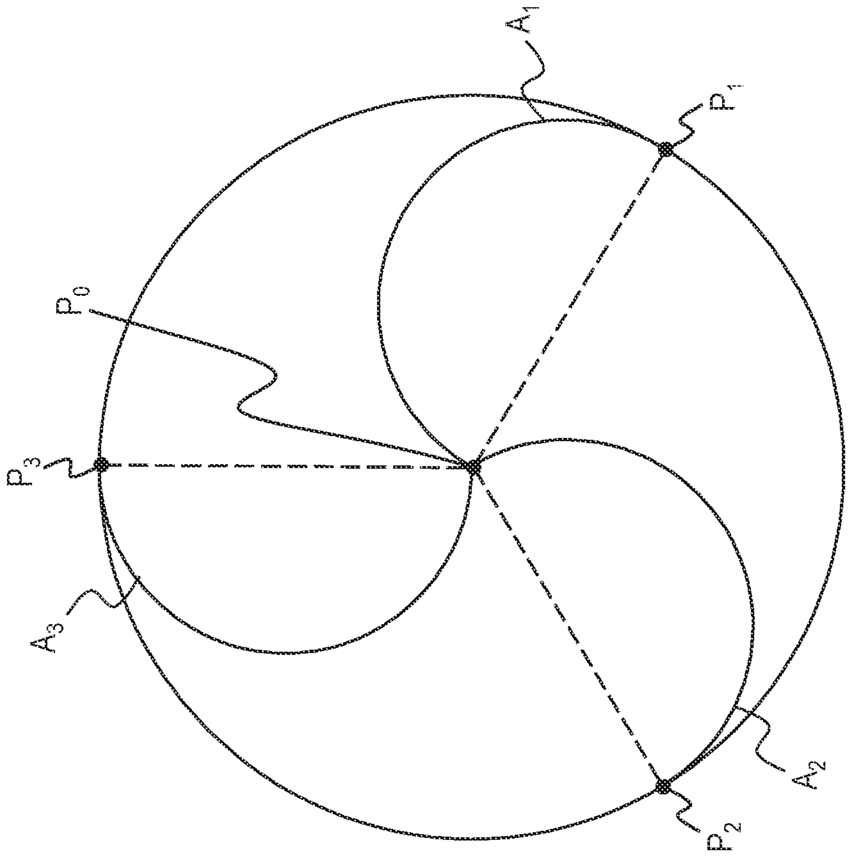
FIG. 2 shows an example of a cut portion defined when a column is viewed from a direction perpendicular to an end surface of the column.

The microphone holders 1 are each in a form that becomes a combination of three comma-shaped figures forming a circle when they are combined as shown in, for example, FIG. 1 to FIG. 3. In this example, the microphone array includes three of the microphone holders 1.

FIG. 1A is a plan view of the microphone holder 1, FIG. 1B is a back view of the microphone holder 1, and FIG. 10 is a right-side view of the microphone holder 1.

In this example, the microphone holders 1 each include a semicolumnar head portion 11 and a tail portion 12 having a width reduced toward a distal end, the width being defined when the microphone holder 1 is viewed from a direction perpendicular to a plane of the microphone holder 1 (a direction perpendicular to a plane of paper in FIG. 1A). The tail portion 12 is curved toward the distal end.

In this example, the microphone holders 1 each also have a mounting surface 13 on which the microphone is to be mounted and a contact surface 14 that may come into contact with the other microphone holder 1 when the microphone holder 1 is combined with another microphone holder 1.

In this example, the microphone is mounted on a boundary B between the head portion 11 and the tail portion 12 on the mounting surface 13 and at a center C of the semicolumnar head portion 11. In FIG. 1A, the boundary B between the head portion 11 and the tail portion 12 on the mounting surface 13 is shown by a dashed line. A sound signal collected by the microphone is outputted to a sound signal processor, which is not shown, by wire or wirelessly. The sound signal processor performs predetermined sound signal processing on the inputted sound signal.

For example, the three microphone holders 1 in FIG. 1 can be produced by cutting a column of a material capable of sufficient sound reflection (for example, synthetic resin, metal, or wood) along arcs $A_1$, $A_2$, and $A_3$ shown in FIG. 2. FIG. 2 shows an example of a cut portion defined when the column is viewed from a direction perpendicular to an end surface.

As shown in FIG. 2, $P_0$ denotes a center of the end surface of the column. Further, $P_1$, $P_2$, and $P_3$ denote points that make 120 degrees with each other on a circumference of the end surface of the column. An angle of intersection between a line $P_0P_1$ and a line $P_0P_2$ is 120 degrees, an angle of intersection between a line $P_0P_2$ and a line $P_0P_3$ is 120 degrees, and an angle of intersection between a line $P_0P_3$ and a line $P_0P_1$ is 120 degrees. In FIG. 2, the line $P_0P_1$, the line $P_0P_2$, and the line $P_0P_3$ are shown by dashed lines. In this case, an arc a diameter of which is the line $P_0P_1$ is $A_1$, an arc a diameter of which is the line $P_0P_2$ is $A_2$, and an arc a diameter of which is the line $P_0P_3$ is $A_3$.

The two or more microphone holders 1 are separatable from each other.

Further, the two or more microphone holders 1 are combinable in two or more combination manners different from each other such that the two or more microphone holders 1 are each in contact with any one of the other microphone holders 1 and a distance between the two respective microphones held by two of the microphone holders 1 that are in contact with each other becomes a predetermined distance.

For example, the microphone holders 1 in FIG. 1 can be combined in a combination of three comma-shaped figures forming a circle as shown in FIG. 3. This combination is referred to as a "first combination manner." A circular microphone array can be implemented by arranging the microphone holders 1 as in the first combination manner.

The first combination manner is especially effective in a case where it is desired to collect sound from all the directions, or 360 degrees, with respect to the microphone array. The first combination manner is especially effective in a case where an angle between ends of an azimuth range from which it is desired to collect sound is 181 degrees or more. Conditions to be satisfied for this combination manner include arranging the microphones on the outer periphery of the circle Ci having a predetermined size. The microphones may be arranged such that the lengths D1 of the lines connecting adjacent ones of the microphones to each other are substantially the same.

Alternatively, the number of the microphone holders 1 may be four or more, although FIG. 3 shows the case where the number of the microphone holders 1 is three.

The microphone holders 1 are combined such that the microphone holders 1 are unlikely to be deformed from a combined state with at least parts of the microphone holders 1 being in contact with each other. The microphone holders 1 may further be provided with a form such as projection and recess or a button; however, it is not essential.

The microphone holders 1 in FIG. 1 can also be combined in a straight line as shown in FIG. 4. This combination is referred to as a "second combination manner." A linear microphone array can be implemented by arranging the microphone holders 1 as in the second combination manner.

The second combination manner is especially effective in a case where it is desired to collect sound within 180 degrees in either the front direction or the rear direction with respect to the microphone array. The second combination manner is especially effective in a case where an angle between ends of an azimuth range from which it is desired to collect sound is 180 degrees or less. Here, the front direction of the microphone array is a direction perpendicular to a direction of extension of the linear microphone array, or a direction parallel with a surface on which the microphone array is placed. Meanwhile, the rear direction of the microphone array is an opposite direction of the microphone array.

Conditions to be satisfied for this combination manner include arranging the microphones such that the straight lines connecting adjacent ones of the microphones are present on the same plane. The microphones may be arranged such that the lengths D2 of the lines connecting adjacent ones of the microphones to each other are substantially the same.

Here, the plane on which the straight lines connecting adjacent ones of the microphones are present refers to a plane facing a predetermined direction. Here, the predetermined direction refers to, for example, a direction from which it is desired to collect sound.

It should be noted that although the microphones are arranged on the straight line L in the present example, the microphones are not necessarily substantially in alignment with each other when combined. For example, the microphones may be arranged in a zigzag manner. The "zigzag" means that, for example, adjacent ones of the microphones are arranged alternately on upper side and lower side relative to the straight line L. However, in this example, all the microphones are substantially in alignment with each other on the straight line L.

The microphone holders 1 are combined such that the microphone holders 1 are unlikely to be deformed from the combined state with at least parts of the microphone holders 1 being in contact.

In either the first combination manner or the second combination manner, the microphone holders 1 are each in contact with another microphone holder 1 not at the mounting surface 13, on which the microphone is mounted, but at the contact surface 14, which may come into contact with the other microphone holder 1 when the microphone holder 1 is combined with the other microphone holder 1.

In FIG. 3 and FIG. 4, C denotes a position where each of the microphone holders 1 holds the microphone.

In the first combination manner, distances D1 (hereinafter, referred to as "first distance") between the two respective microphones held by two of microphone holders that are in contact with each other are substantially the same. In the second combination manner, distances D2 (hereinafter, referred to as "second distance") between the two respective microphones held by two of microphone holders that are in contact with each other are substantially the same. Here, the first distance and the second distance are different from each other.

That is, a distance between the two respective microphones held by two of the microphone holders that are in contact with each other in a case where the two or more microphone holders are combined in the first combination manner of the two or more combination manners different from each other may be different from a distance between the two respective microphones held by two of the microphone holders that are in contact with each other in a case where the two or more microphone holders are combined in the second combination manner other than the first combination manner of the two or more combination manners different from each other.

That is, the microphone holders 1 are separatable from each other and combinable in the two or more combination manners different from each other. This makes it possible to more easily change the arrangement of the microphone array than ever.

Modification Examples

The embodiments of the present invention are described above; however, a specific configuration is not limited to these embodiments and it goes without saying that any alteration in design and the like performed as needed without departing from the spirit of the present invention falls within the scope of the present invention.

For example, the microphone holders 1 may have a form other than the form shown in FIG. 1 to FIG. 3.

For example, the microphone holders 1 may have a form including a semispherical head portion 11 and a tail portion 12 tapered toward a distal end as shown in FIG. 5. The tail portion 12 is curved toward the distal end. FIG. 5A is a plan view of a microphone holder 1, FIG. 5B is a back view of the microphone holder 1, FIG. 5C is a right-side view of the microphone holder 1, FIG. 5D is a left-side view of the microphone holder 1, and FIG. 5E is a front view of the microphone holder 1. In this case, the microphone is mounted inside the head portion 11 (for example, at a center of the head portion 11).

Figure 6:
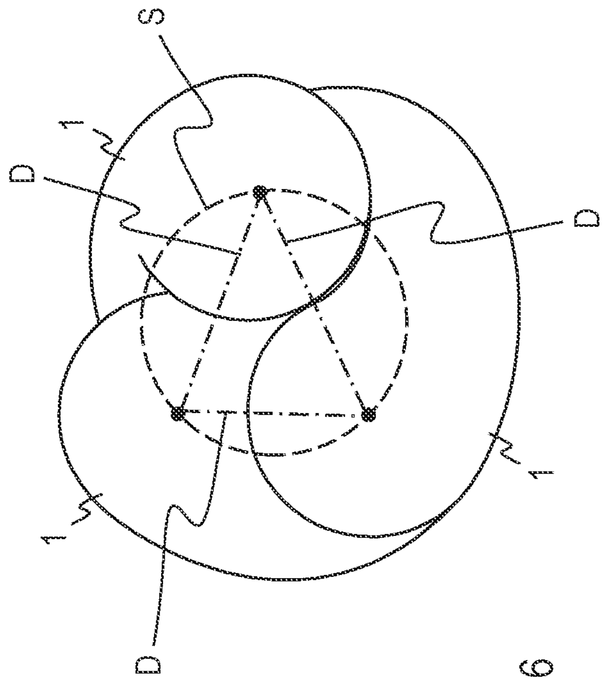
FIG. 6 shows an example of a combination manner of the microphone holder in FIG. 5.

The microphone holders 1 in this form can be combined in a combination of three comma-shaped figures forming a sphere, for example, as shown in FIG. 6.

When the microphone holders 1 are combined, the microphones are arranged on an outer periphery of a sphere S having a predetermined size. It should be noted that a centroid defined when the microphone holders 1 are combined is a center of the sphere S. It should be noted that the lengths D of the lines connecting adjacent ones of the microphones to each other are substantially the same also in an example of FIG. 6.

Figure 7:
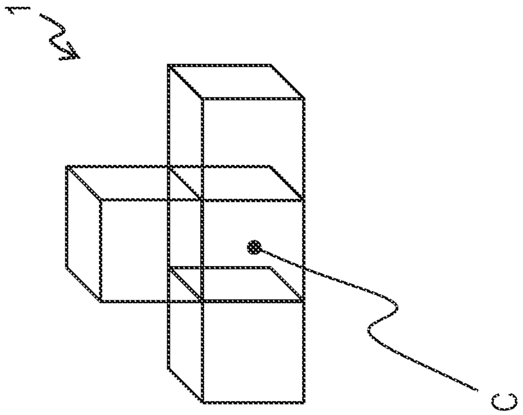
FIG. 7 shows an example of the microphone holder.

Alternatively, the microphone holders 1 may each be in a form where four cubes are combined in a T-shape as shown in FIG. 7.

Figure 8:
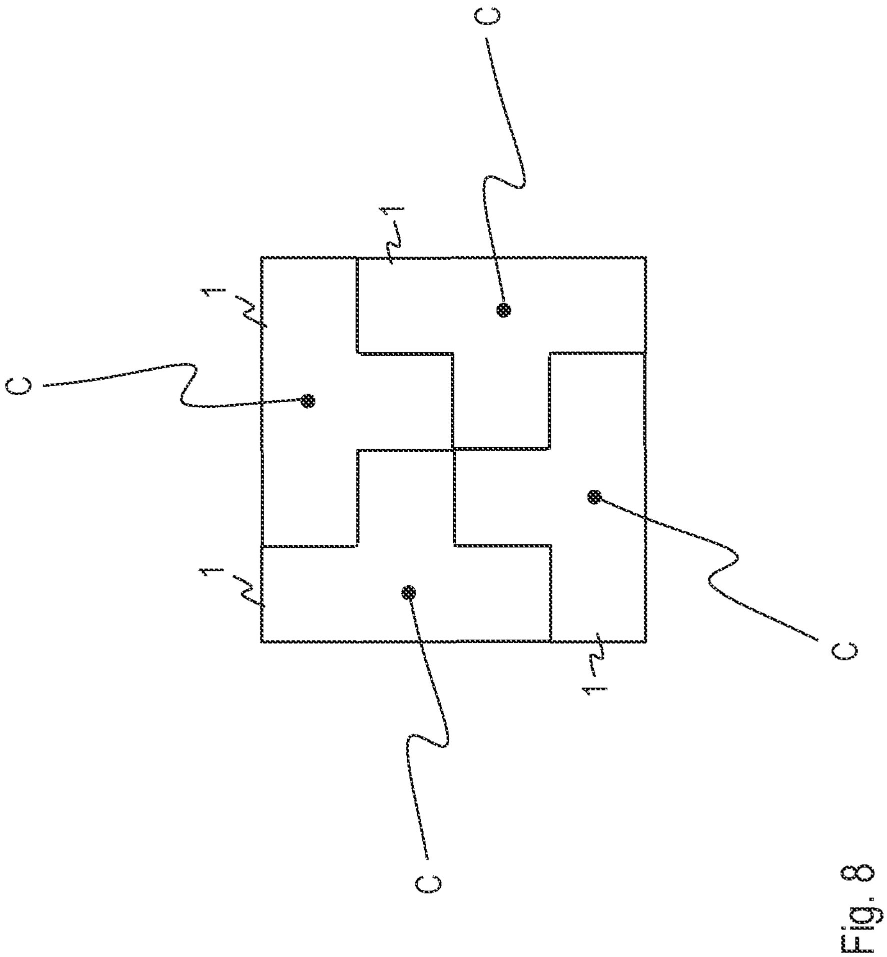
FIG. 8 shows an example of a combination manner of the microphone holder in FIG. 7.
Figure 9:
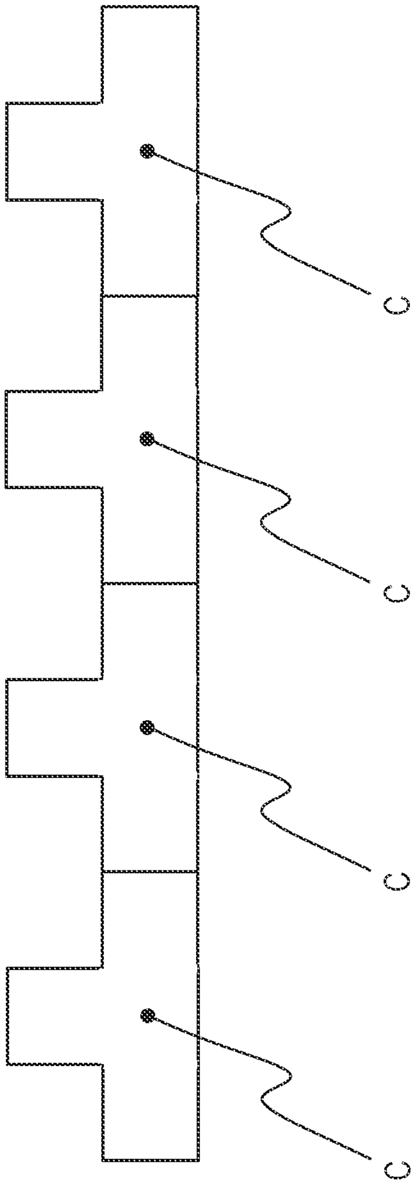
FIG. 9 shows an example of the combination manner of the microphone holder in FIG. 7.

The microphone holders 1 in FIG. 7 can be combined, for example, as shown in FIG. 8. Further, the microphone holders 1 in FIG. 7 can be combined, for example, as shown in FIG. 9. FIG. 8 and FIG. 9 are plan views of the microphone array where the microphone holders 1 in FIG. 7 are combined.

In FIGS. 7 to 9, C denotes a position where the microphone is to be mounted.

Further, for example, the microphone holders 1 may each hold at least one microphone. In other words, the microphone holders 1 may include a microphone holder 1 that holds two or more microphones.

For example, in the example of the microphone holders 1 in FIG. 1, a microphone may be additionally mounted on a mounting surface 13*a*, which is, a surface opposite the mounting surface 13. For example, the additional microphone is mounted on a boundary between the head portion 11 and the tail portion 12 and at a center of the semicolumnar head portion 11 on the mounting surface 13*a* as the microphone mounted on the mounting surface 13.

This means that the three microphone holders 1 may each hold two microphones. In this case, for example, the microphones are mounted on the two respective opposite mounting surfaces 13 and 13*a* of each of the three microphone holders 1.

The description is made by taking a microphone array as an example; however, the present invention may, of course, also be implemented as a speaker array with a similar configuration. In addition, the present invention may be implemented as a smart speaker capable of a structural recombination with functions of both a microphone array and a speaker array.

In other words, the microphone holders 1 may each hold a speaker instead of a microphone.

REFERENCE SIGNS LIST

1 Microphone holder
11 Head portion
12 Tail portion
13, 13*a* Mounting surface
14 Contact surface

The invention claimed is:

1. A microphone array comprising two or more microphone holders, wherein the two or more microphone holders each hold one microphone, the two or more microphone holders are separatable from each other, the two or more microphone holders comprise a first microphone holder and a second microphone holder, the first microphone holder and the second microphone holder are combinable in two or more combination manners different from each other such that the two or more microphone holders are each in contact with any one of the other microphone holders and a distance between the two respective microphones held by two of the microphone holders that are in contact with each other is a predetermined distance, the two or more combination manners comprise a first combination manner and a second combination manner, the first combination manner is distinct from the second combination manner, the first combination manner indicates a first distance between the first microphone and the second microphone in respective microphone holders are in contact with each other according to the first combination manner, the second combination manner indicates a second distance between the first microphone and the second microphone in respective microphone holders are in contact with each other according to the second combination manner, the first distance is distinct from the second distance, the two or more microphone holders are three or more microphone holders, and in the first combination manner, the three respective microphones held by the three or more microphone holders are arranged on an outer periphery of a circle having a predetermined size, and wherein the first combination manner is a combination manner causing the three or more microphone holders to be in a combination of three comma-shaped figures forming a circle.

2. The microphone array according to claim 1, wherein a third difference between the first microphone and a third microphone in respective microphone holders in contact with each other according to the first combination manner is substantially the same as the first distance.

3. The microphone array according to claim 1, wherein the two or more microphone holders each hold at least one microphone.

4. A microphone array comprising two or more microphone holders, wherein the two or more microphone holders each hold one microphone, the two or more microphone holders are separatable from each other, the two or more microphone holders are combinable in two or more combination manners different from each other such that the two or more microphone holders are each in contact with any one of the other microphone holders and a distance between the two respective microphones held by two of the microphone holders that are in contact with each other is a predetermined distance, the two or more combination manners comprise a first combination manner and a second combination manner, the first combination manner is distinct from the second combination manner, the first combination manner indicates a first distance between the first microphone and the second microphone in respective microphone holders are in contact with each other according to the first combination manner, the second combination manner indicates a second distance between the first microphone and the second microphone in respective microphone holders are in contact with each other according to the second combination manner, the first distance is distinct from the second distance, the two or more microphone holders are three or more microphone holders, and in the first combination manner, the three respective microphones held by the three or more microphone holders are arranged on an outer periphery of a circle having a predetermined size, and in the second combination manner, the three respective microphones held by the three or more microphone holders are arranged such that straight lines connecting the microphones with each other are present on a same plane.

5. The microphone array according to claim 4, wherein the two or more microphone holders are combinable in the two or more combination manners different from each other such that distances between two respective microphones held by two of the microphone holders that are in contact with each other are substantially a same.

6. A microphone array comprising two or more microphone holders, wherein the two or more microphone holders each hold one microphone, the two or more microphone holders are separatable from each other, the two or more microphone holders are combinable in two or more combination manners different from each other such that the two or more microphone holders are each in contact with any one of the other microphone holders and a distance between the two respective microphones held by two of the microphone holders that are in contact with each other is a predetermined distance, the two or more combination manners comprise a first combination manner and a second combination manner, the first combination manner is distinct from the second combination manner, the first combination manner indicates a first distance between the first microphone and the second microphone in respective microphone holders are in contact with each other according to the first combination manner, the second combination manner indicates a second distance between the first microphone and the second microphone in respective microphone holders are in contact with each other according to the second combination manner, the first distance is distinct from the second distance, the two or more microphone holders are three or more microphone holders, and in the first combination manner, the three respective microphones held by the three or more microphone holders are arranged on an outer periphery of a circle having a predetermined size, and the three or more microphone holders each hold two microphones, and the microphones are mounted on two respective opposite mounting surfaces of each of the three or more microphone holders.

7. The microphone array according to claim 6, wherein the two or more microphone holders are combinable in the two or more combination manners different from each other such that distances between two respective microphones held by two of the microphone holders that are in contact with each other are substantially a same.

* * * * *